(12) United States Patent
Katori et al.

(10) Patent No.: US 10,930,973 B2
(45) Date of Patent: Feb. 23, 2021

(54) PRODUCTION METHOD FOR LGPS-BASED SOLID ELECTROLYTE

(71) Applicant: MITSUBISHI GAS CHEMICAL COMPANY, INC., Tokyo (JP)

(72) Inventors: Aki Katori, Niigata (JP); Kotaro Kawakami, Niigata (JP); Masahiro Shimada, Tokyo (JP); Yuki Takase, Tokyo (JP); Tomohiro Ito, Niigata (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 36 days.

(21) Appl. No.: 16/494,514

(22) PCT Filed: Mar. 16, 2018

(86) PCT No.: PCT/JP2018/010373
§ 371 (c)(1),
(2) Date: Sep. 16, 2019

(87) PCT Pub. No.: WO2018/173939
PCT Pub. Date: Sep. 27, 2018

(65) Prior Publication Data
US 2020/0020977 A1    Jan. 16, 2020

(30) Foreign Application Priority Data

Mar. 22, 2017  (JP) .............................. JP2017-055754
Sep. 11, 2017  (JP) .............................. JP2017-173878

(51) Int. Cl.
*H01M 10/052*   (2010.01)
*H01M 10/0562*  (2010.01)
*C01B 25/14*    (2006.01)
*C04B 35/547*   (2006.01)
*C04B 35/622*   (2006.01)

(52) U.S. Cl.
CPC .............................. *H01M 10/0562* (2013.01)

(58) Field of Classification Search
CPC ........... H01M 10/052; H01M 10/0562; H01M 2300/0068; Y02E 60/10; C01B 25/14;
(Continued)

(56) References Cited

U.S. PATENT DOCUMENTS

| 2013/0040208 A1* | 2/2013 | Kanno ................. C01G 17/006 429/319 |
| 2015/0093652 A1 | 4/2015 | Aihara et al. |

(Continued)

FOREIGN PATENT DOCUMENTS

| JP | 2013-37897 | 2/2013 |
| JP | 2015-050153 A | 3/2015 |

(Continued)

OTHER PUBLICATIONS

Supplementary European Search Report dated Feb. 24, 2020 in EP Application No. 18771992.7.

(Continued)

*Primary Examiner* — Brittany L Raymond
(74) *Attorney, Agent, or Firm* — Greenblum & Bernstein, P.L.C.

(57) ABSTRACT

The present invention provides an LGPS-based solid electrolyte production method characterized by having a step in which a mixture of $Li_3PS_4$ crystals having a peak at 420±10 $cm^{-1}$ in a Raman measurement and $Li_4MS_4$ crystals (M being selected from the group consisting of Ge, Si, and Sn) is heat treated at 300-700° C. In addition, the present invention can provide an LGPS-based solid electrolyte production method characterized by having: a step in which $Li_3PS_4$ crystals having a peak at 420±10 $cm^{-1}$ in a Raman measurement, $Li_2S$ crystals, and sulfide crystals indicated by $MS_2$ (M being selected from the group consisting of Ge, Si, and Sn) are mixed while still having crystals present and a (Continued)

precursor is synthesized; and a step in which the precursor is heat treated at 300-700° C.

13 Claims, 4 Drawing Sheets

(58) Field of Classification Search
CPC .............. C01P 2002/72; C01P 2002/82; C01P 2006/40; C04B 35/547; C04B 35/6261; C04B 2235/3203; C04B 2235/3287; C04B 2235/3418; C04B 2235/42; C04B 2235/444; C04B 2235/5436; C04B 2235/5445; C04B 2235/5463
See application file for complete search history.

(56) References Cited

U.S. PATENT DOCUMENTS

2015/0372345 A1   12/2015   Kato et al.
2016/0064771 A1*  3/2016    Osaki .................. C01B 25/45
                                                       429/322
2018/0205116 A1   7/2018    Kanno et al.
2019/0074541 A1   3/2019    Kanno et al.

FOREIGN PATENT DOCUMENTS

| JP | 2015-232965 | 12/2015 |
| WO | 2011/118801 | 9/2011 |
| WO | 2014/109191 | 7/2014 |
| WO | 2017/007030 | 1/2017 |
| WO | 2017/155119 A1 | 9/2017 |

OTHER PUBLICATIONS

Yuki K. et al., "High-power all-solid-state batteries using sulfide superionic conductors", Nature Energy 1, Article No. 16030, Mar. 21, 2016, PP.

Official Communication issued in International Bureau of WIPO Patent Application No. PCT/JP2018/010373, dated Jun. 19, 2018.

* cited by examiner

[Figure 1]
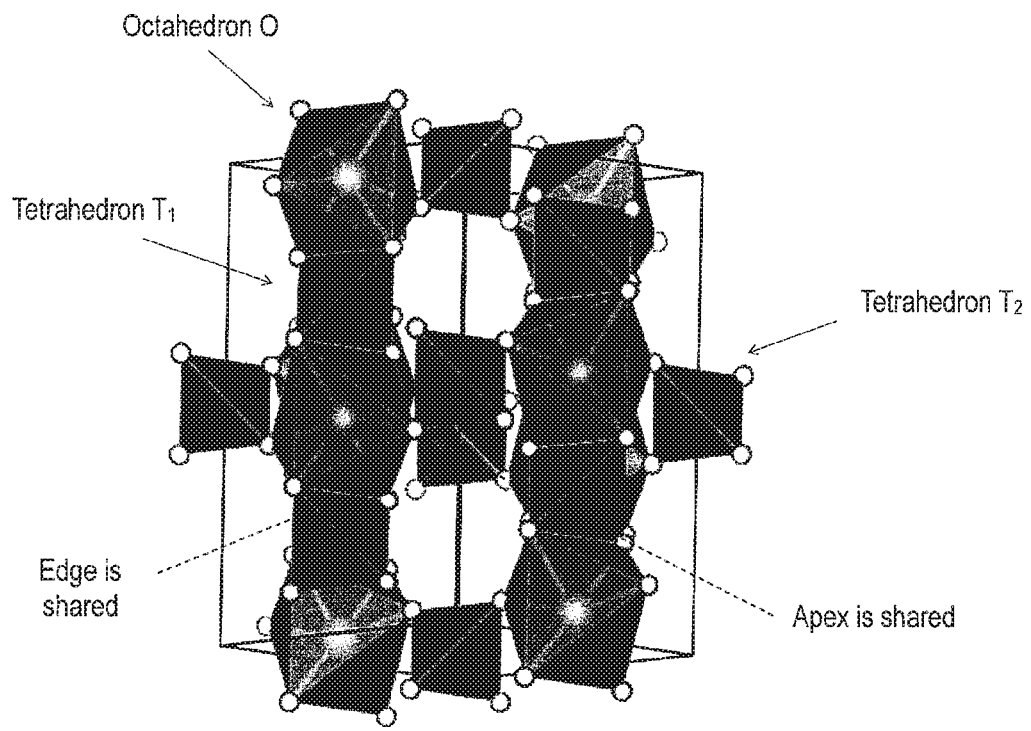
[Figure 2]
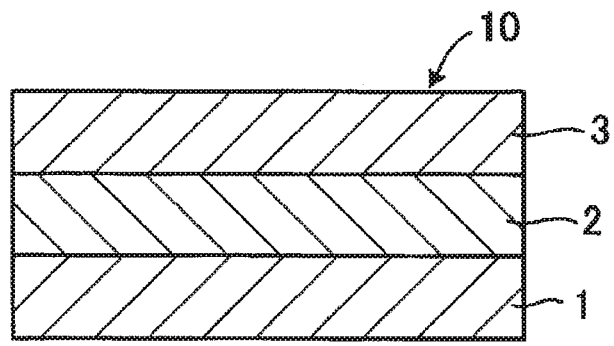

[Figure 3]
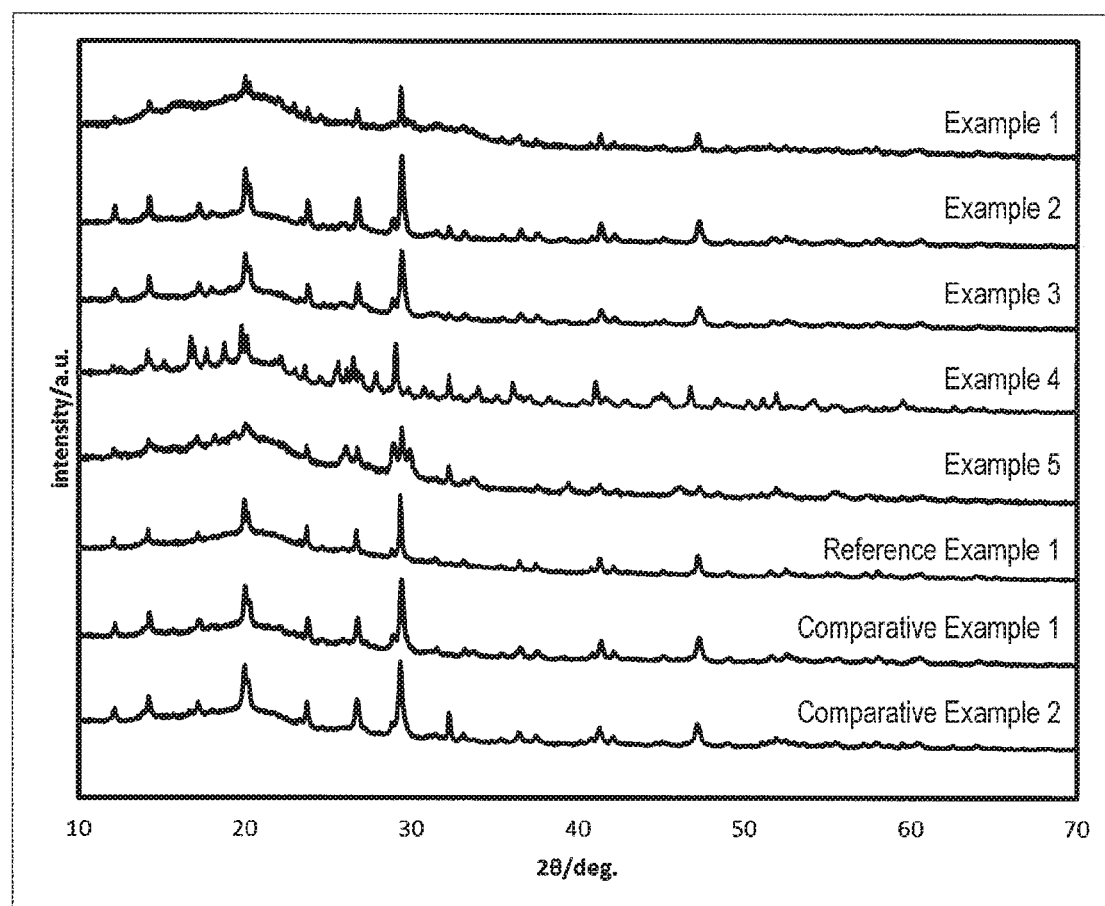

[Figure 4]
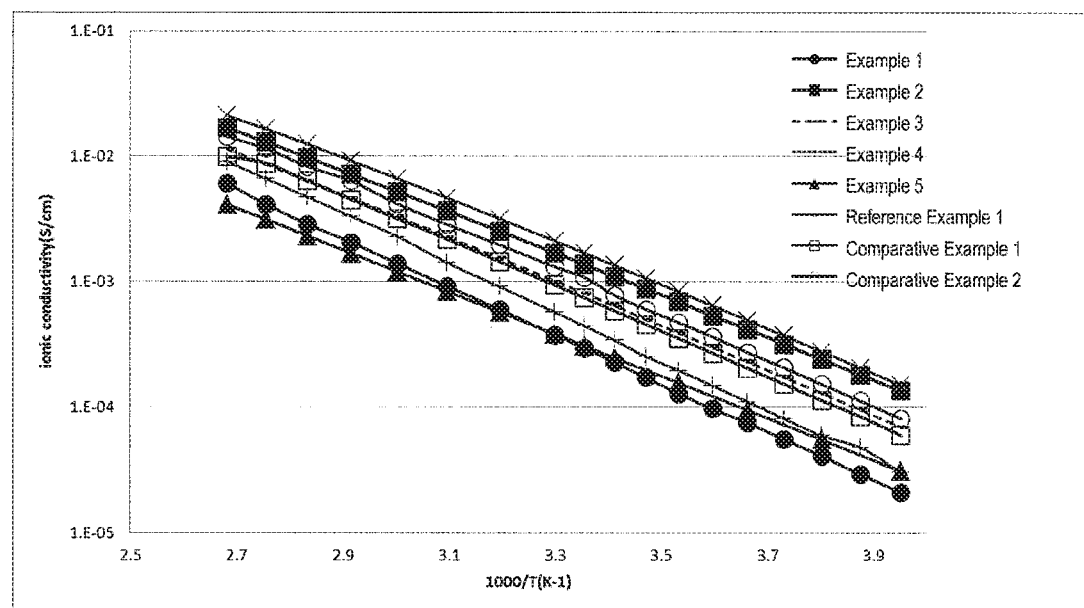

[Figure 5]
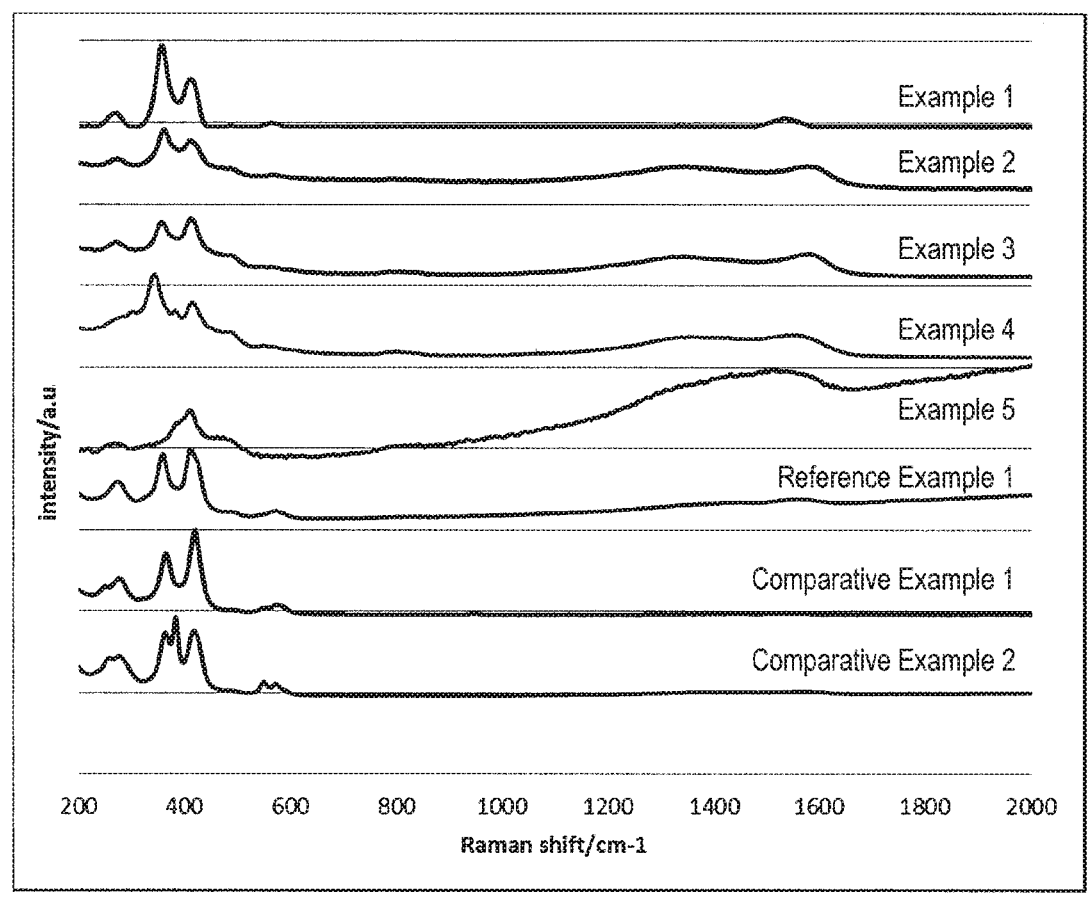

PRODUCTION METHOD FOR LGPS-BASED SOLID ELECTROLYTE

TECHNICAL FIELD

The present invention relates to a method for producing an LGPS-based solid electrolyte. The LGPS-based solid electrolyte refers to a solid electrolyte having a specific crystal structure including Li, P and S, and examples thereof include a solid electrolyte including Li, M (M is at least one element selected from the group consisting of Ge, Si and Sn), P and S.

BACKGROUND ART

Recently, a demand for lithium ion secondary batteries has been increased in applications including portable information terminals, portable electronic equipments, electric vehicles, hybrid electric vehicles and stationary power storage systems. However, currently, a flammable organic solvent is used as an electrolytic solution in lithium ion secondary batteries, and a strong exterior is required so that an organic solvent does not leak out. Further, for example, in the case of portable personal computers, it is necessary to employ a structure against a risk at the time when an electrolytic solution leaks out. Thus, there is a limitation on structures of devices.

Moreover, the range of applications thereof has been widened to movable bodies such as vehicles and aircrafts, and a high capacity is desired for stationary lithium ion secondary batteries. Under such circumstances, importance tends to be placed on safety more than before, and efforts are concentrated on the development of an all-solid-state lithium ion secondary battery in which none of toxic substances such as organic solvents is used.

For example, use of an oxide, phosphate compound, organic polymer, sulfide or the like as a solid electrolyte in an all-solid-state lithium ion secondary battery has been examined.

Among these solid electrolytes, the sulfide has characteristics that it has high ion conductivity and is relatively soft, and that it is easy to form the interface between solids. The sulfide is stable with respect to active materials and has been developed as a practical solid electrolyte.

Among sulfide solid electrolytes, there is an LOPS-based solid electrolyte having a specific crystal structure (Non-Patent Document 1 and Patent Document 1). Among sulfide solid electrolytes, LOPS has significantly high ion conductivity and can stably act at from a low temperature of −30° C. to a high temperature of 100° C., and therefore practical use thereof is highly expected.

However, in conventional methods for producing an LOPS-based solid electrolyte, the amorphous step including a complex treatment is required, and $P_2S_5$ which has high volatility and decomposability is used as a raw material, and for this reason, there are problems that synthesis can be carried out only at a small scale, and that an LOPS-based solid electrolyte exhibiting stable performance cannot be easily obtained.

PRIOR ART DOCUMENTS

Patent Documents

Patent Document 1: International Publication WO2011/118801 pamphlet

Non-Patent Documents

Non-Patent Document 1: Nature Energy 1, Article number: 16030 (2016)

SUMMARY OF THE INVENTION

Problems to be Solved by the Invention

Under the above-described circumstances, it has been desired to provide a method for producing an LGPS-based solid electrolyte which has excellent productivity, suppresses the generation of by-products and exhibits stable performance.

Means for Solving the Problems

The present inventors diligently made researches in consideration of the above-described problem and obtained an unexpected finding that by using $Li_3PS_4$ crystals, $Li_2S$ crystals and $MS_2$ crystals (M is selected from the group consisting of Ge, Si and Sn) as raw materials, a stable LGPS-based solid electrolyte with little impurities can be produced without the amorphous step.

Specifically, the present invention is as described below.

<1> A method for producing an LGPS-based solid electrolyte, which comprises: a step in which $Li_3PS_4$ crystals having a peak at 420±10 cm$^{-1}$ in a Raman measurement and $Li_4MS_4$ crystals (M being selected from the group consisting of Ge, Si and Sn) are mixed while still having crystals present to synthesize a precursor; and a step in which the precursor is heat treated at 300 to 700° C.

<2> The method according to item <1>, which comprises a step in which the $Li_4MS_4$ crystals are synthesized from $Li_2S$ crystals and sulfide crystals represented by $MS_2$ (M being selected from the group consisting of Ge, Si and Sn).

<3> A method for producing an LGPS-based solid electrolyte, which comprises: a step in which $Li_3PS_4$ crystals having a peak at 420±10 cm$^{-1}$ in a Raman measurement, $Li_2S$ crystals and sulfide crystals represented by $MS_2$ (M being selected from the group consisting of Ge, Si and Sn) are mixed while still having crystals present to synthesize a precursor; and a step in which the precursor is heat treated at 300 to 700° C.

<4> The method according to any one of items <1> to <3>, wherein the LGPS-based solid electrolyte has peaks at at least 2θ=20.18°±0.50°, 20.44°±0.50°, 26.96°±0.50° and 29.58°±0.60° in X-ray diffraction (CuKα: λ=1.5405 Å).

<5> The method according to item <4>, wherein when the diffraction intensity of the peak at 2θ=29.58°±0.60° is referred to as $I_A$ and the diffraction intensity of the peak at 2θ=27.33°±0.50° is referred to as $I_B$, $I_B/I_A$ is less than 0.50.

<6> The method according to any one of items <1> to <5>, wherein the LGPS-based solid electrolyte has an octahedron O composed of a Li element and a S element, a tetrahedron $T_1$ composed of at least one element selected from the group consisting of P, Ge, Si and Sn and an S element, and a tetrahedron $T_2$ composed of a P element and a S element, and mainly includes a crystal structure in which the tetrahedron $T_1$ and the octahedron O share an edge and the tetrahedron $T_2$ and the octahedron O share an apex.

<7> The method according to any one of items <1> to <6>, wherein the $Li_3PS_4$ crystals are β-$Li_3PS_4$.

<8> The method according to any one of items <1> to <7>, wherein the heat treatment step is carried out under inert gas atmosphere.

Advantageous Effect of the Invention

According to the present invention, it is possible to provide a method for producing an LGPS-based solid electrolyte. In addition, according to the present invention, it is possible to provide a formed body obtained by heating and forming the LGPS-based solid electrolyte and an all-solid-state battery including the LGPS-based solid electrolyte.

Moreover, this production method can be applied to mass production.

BRIEF DESCRIPTION OF THE DRAWINGS

FIG. 1 is a schematic view showing a crystal structure of an LGPS-based solid electrolyte according to one embodiment of the present invention.

FIG. 2 is a schematic cross sectional view of an all-solid-state battery according to one embodiment of the present invention.

FIG. 3 is a graph showing the results of the X-ray diffraction measurement of the ion conductors obtained in Examples 1-5, Comparative Examples 1-2 and Reference Example 1.

FIG. 4 is a graph showing the results of the ion conductivity measurement of the ion conductors obtained in Examples 1-5, Comparative Examples 1-2 and Reference Example 1.

FIG. 5 is a graph showing the results of Raman spectroscopy of the ion conductors obtained in Examples 1-5, Comparative Examples 1-2 and Reference Example 1.

EMBODIMENTS FOR CARRYING OUT THE INVENTION

Hereinafter, the method for producing the LGPS-based solid electrolyte of the present invention will be specifically described. Note that materials, constitutions, etc. described below do not limit the present invention and can be modified variously within the range of the gist of the present invention.

<Method for Producing LGPS-based Solid Electrolyte>

According to one embodiment of the present invention, the method for producing the LGPS-based solid electrolyte comprises: a step in which $Li_3PS_4$ crystals having a peak at $420\pm10$ cm$^{-1}$ in a Raman measurement and $Li_4MS_4$ crystals (M is selected from the group consisting of Ge, Si and Sn) are mixed while still having crystals present to synthesize a precursor; and a step in which the precursor is heat treated at 300 to 700° C.

Further, according to another embodiment of the present invention, the method for producing the LGPS-based solid electrolyte comprises: a step in which $Li_3PS_4$ crystals having a peak at $420\pm10$ cm$^{-1}$ in a Raman measurement, $Li_2S$ crystals and sulfide crystals represented by $MS_2$ (M is selected from the group consisting of Ge, Si and Sn) are mixed while still having crystals present to synthesize a precursor; and a step in which the precursor is heat treated at 300 to 700° C.

The LGPS-based solid electrolyte preferably has peaks at at least $2\theta=20.18°\pm0.50°$, $20.44°\pm0.50°$, $26.96°\pm0.50°$ and $29.58°\pm0.60°$ (more preferably) $29.58°\pm0.50°$ in X-ray diffraction (CuKα: λ=1.5405 Å). More preferably, it has peaks at $2\theta=17.38°\pm0.50°$, $20.18°\pm0.50°$, $20.44°\pm0.50°$, $23.56°\pm0.50°$, $26.96°\pm0.50°$, $29.07°\pm0.50°$, $29.58°\pm0.60°$ (more preferably $29.58°\pm0.50°$) and $31.71°\pm0.50°$.

Further, regarding the LGPS-based solid electrolyte, when the diffraction intensity of the peak at $2\theta=29.58°\pm0.60°$ (more preferably $29.58°\pm0.50°$) is referred to as $I_A$ and the diffraction intensity of the peak at $2\theta=27.33°\pm0.50°$ is referred to as $I_B$, $I_B/I_A$ is preferably less than 0.50. More preferably, $I_B/I_A$ is less than 0.40. This is because the peak of LGPS crystals corresponds to $I_A$ and a crystal phase having low ion conductivity corresponds to $I_B$.

Moreover, it is preferred that the LOPS-based solid electrolyte has an octahedron O composed of an Li element and an S element, a tetrahedron $T_1$ composed of at least one element selected from the group consisting of P, Ge, Si and Sn and an S element, and a tetrahedron $T_2$ composed of a P element and an S element, and mainly includes a crystal structure in which the tetrahedron $T_1$ and the octahedron O share an edge and the tetrahedron $T_2$ and the octahedron O share an apex as shown in FIG. 1.

As a conventional method for producing an LGPS-based solid electrolyte, after synthesizing an ion conductor using $Li_2S$, $P_2S_5$ and $M_xS_y$ (e.g., $GeS_2$) as raw materials, a mechanical milling method using a vibrating mill or planetary ball mill (Patent Document) or a melt quenching method described in International Publication WO2014/196442 pamphlet is carried out. However, in the case of the mechanical milling method, it is difficult to carry out increase in scale to an industrial scale, and carrying out the melt quenching method without being exposed to atmosphere is significantly limited in view of atmosphere control. Note that the LGPS-based solid electrolyte and raw materials thereof have a property that these react with moisture or oxygen in the atmosphere to change in quality. In this regard, according to the production method of the present invention, the amorphization step is not required. $Li_3PS_4$ crystals, and $Li_2S$ crystals and $MS_2$ crystals (alternatively, commercially-available $Li_4MS_4$ crystals or $Li_4MS_4$ crystals obtained from $Li_2S$ crystals and $MS_2$ crystals) are used as raw materials and mixed in the presence of a solid phase or solvent to obtain a precursor, and then the heat treatment is carried out, thereby obtaining an LGPS-based solid electrolyte. Further, it is important to use the $Li_3PS_4$ crystals as raw materials because volatilization/decomposition of the precursor at the time of the heat treatment can be suppressed thereby. When $P_2S_5$ exists in the precursor (it can be judged by a Raman measurement), the generation of by-products and the amount of unreacted raw materials increase in the heat treatment step due to $P_2S_5$ having high volatility/decomposability, and for this reason, a stable and high-performance LGPS-based solid electrolyte cannot be easily obtained.

<Step of Synthesizing $Li_4MS_4$ Crystals>

As the $Li_4MS_4$ crystals in the present invention, a commercially-available product can be used, but for example, the $Li_4MS_4$ crystals can be synthesized from $Li_2S$ crystals and sulfide crystals represented by $MS_2$ (M is selected from the group consisting of Ge, Si and Sn) under inert gas atmosphere (e.g., argon). For example, in one example of the method for producing $Li_4GeS_4$ crystals, $Li_2S$ and $GeS_2$ are weighed so that the molar ratio of $Li_2S$:$GeS_2$ becomes 2:1, and the materials are mixed using an agate mortar. Subsequently, the obtained mixture is burned at 650 to 750° C. for 1 to 12 hours under inert gas atmosphere (e.g., argon), thereby producing $Li_4GeS_4$ crystals.

<Step of Synthesizing Precursor>

The $Li_3PS_4$ crystals may be either α, β or γ type, but β-LPS is more preferred. This is because it exists relatively stably in the LGPS synthesis system.

As the $Li_2S$ crystals, a synthesized product or commercially-available product can be used. The lower the content of moisture is, the better it is because mixing of moisture deteriorates the other raw materials and the precursor. The content is more preferably 300 ppm or less, and particularly preferably 50 ppm or less.

Regarding the $MS_2$ crystals, M is an element selected from the group consisting of Ge, Si and Sn, and usually, the valence of the element is preferably tetravalent. Specifically, $GeS_2$, $SiS_2$ and $SnS_2$ can be employed, and a commercially-available product can be used.

Note that there is no problem even when a part of the above-described raw materials to be used are amorphous.

For all the raw material crystals, it is important that the particle diameter is small, and the particle diameter is preferably 10 nm to 10 μm, more preferably 10 nm to 5 μm, and even more preferably 100 nm to 1 μm. Note that the particle diameter can be measured by means of SEM, a particle size distribution measurement apparatus utilizing laser scattering, or the like. By employing small particles, a reaction is easily performed at the time of the heat treatment, and the generation of by-products can be suppressed.

In the step of synthesizing the precursor, $Li_3PS_4$ crystals, and $Li_2S$ crystals and $MS_2$ crystals (alternatively, commercially-available $Li_4MS_4$ crystals or $Li_4MS_4$ crystals obtained from $Li_2S$ crystals and $MS_2$ crystals) are mixed while still having crystals present, thereby obtaining the precursor. The molar ratio thereof may be adjusted so as to provide the ratio of elements constituting the above-described crystal structure. For example, in the case of $Li_{10}GeP_2S_{12}$, mixing is carried out at a molar ratio of $Li_3PS_4:Li_2S:GeS_2=2:2:1$. Alternatively, mixing is carried out at a molar ratio of $Li_3PS_4:Li_4GeS_4=2:1$.

The mixing method can be carried out in the presence of a solid phase or solvent. Note that the mixing method using a solvent is suitable for the case of large-scale synthesis because homogeneous mixing can be performed thereby. When using a solvent, it is preferred to use a solvent which does not react with raw materials or a precursor obtained. Examples of the solvent include an ether-based solvent, an ester-based solvent, a hydrocarbon-based solvent and a nitrile-based solvent. Specific examples thereof include tetrahydrofuran, cyclopentyl methyl ether, diisopropyl ether, diethyl ether, dimethyl ether, dioxane, methyl acetate, ethyl acetate, butyl acetate and acetonitrile. For preventing deterioration of the raw material composition, it is preferred to remove oxygen and moisture in the solvent in advance. In particular, regarding the moisture content, it is preferably 100 ppm or less, and more preferably 50 ppm or less. Regarding mixing, synthesis is preferably performed under inert gas atmosphere. As the inert gas, nitrogen, helium, argon or the like can be used, and by also removing oxygen and moisture in the inert gas, deterioration of the raw material composition can be suppressed. The concentration of each of oxygen and moisture in the inert gas is preferably 1000 ppm or less, more preferably 100 ppm or less, and particularly preferably 10 ppm or less.

At the time of mixing, a substrate may be in a homogeneously dispersed slurry state, but more preferably, a part of raw materials (regardless of the type) is dissolved. In the case of a slurry, it is preferably disintegrated by means of stirring for the purpose of crushing aggregated particles. Moreover, a homogenizer or an ultrasonic disperser may also be used.

In the case of mixing in the presence of a solid phase, mixing by using a mortar, a mortar machine, a ball mill or the like can be used. In the case of these methods, usually, crystals are not amorphized. Regarding mixing, synthesis is preferably performed under vacuum or inert gas atmosphere, and conditions thereof are the same as those in the case of using a solvent.

Regarding the temperature for mixing, heating is not required, but in the case of using a solvent, heating can be performed for increasing the solubility or dissolution speed of the substrates. When heating is performed, it is sufficient when it is performed at a temperature that is the boiling point of the solvent or lower. However, heating can also be performed under the pressurized state using an autoclave or the like, Note that when mixing is carried out at a high temperature, the reaction proceeds before the raw materials are sufficiently mixed and by-products are easily generated. For this reason, mixing is preferably carried out at near room temperature.

Regarding the mixing time, it is sufficient when the time necessary for obtaining a homogenous mixture can be ensured. The time is often influenced by a manufacturing scale, but for example, a homogenous mixture can be obtained by mixing for 0.1 to 24 hours.

When using the solvent, the precursor is obtained by removing the solvent. The solvent is removed by means of heated-air drying or vacuum drying, and the optimum temperature for it varies depending on the type of the solvent. The time for removing the solvent can be shortened by applying a temperature sufficiently higher than the boiling point. The temperature for removing the solvent is preferably 60 to 280° C., and more preferably 100 to 250° C. By removing the solvent under reduced pressure as in the case of vacuum drying or the like, the temperature at the time of removing the solvent can be lowered and the required time can be shortened. In addition, the time required for removing the solvent can also be shortened by flowing an inert gas such as nitrogen and argon in which the moisture content is sufficiently low. Note that the heat treatment step described below and removal of the solvent can be carried out simultaneously.

<Heat Treatment Step>

In the production method of the present invention, the precursor obtained in the precursor synthesis step is heat treated, thereby obtaining the LGPS-based solid electrolyte. The heating temperature varies depending on the type, and in the case of containing Ge, Si or Sn, the heating temperature is usually 300 to 700° C., more preferably 350 to 650° C., and particularly preferably 450 to 600° C. When the temperature is lower than the above-described range, desired crystals are not easily generated, and when the temperature is higher than the above-described range, crystals other than those desired are generated.

The heating time slightly varies depending on the heating temperature, but usually, crystallization is sufficiently performed when the heating time is 0.1 to 24 hours. It is not preferred that heating is carried out at a high temperature for a long period of time which exceeds the above-described range because there is concern for change in quality of the LGPS-based solid electrolyte.

Regarding heating, synthesis can be performed under vacuum or inert gas atmosphere, but preferably performed under inert gas atmosphere. As the inert gas, nitrogen, helium, argon or the like can be used, and among them, argon is preferred. The contents of oxygen and moisture are preferably low, and conditions thereof are the same as those at the time of mixing in the precursor synthesis step.

The LGPS-based solid electrolyte of the present invention obtained in the above-described manner can be formed into a desired formed body by various means and can be used for various applications including an all-solid-state battery described below. The forming method is not particularly limited. For example, a method similar to the method for forming respective layers constituting the all-solid-state battery described below with respect to the all-solid-state battery can be used.

<All-Solid-State Battery>

The LGPS-based solid electrolyte of the present invention can be used, for example, as a solid electrolyte for all-solid-state batteries. Further, according to another embodiment of the present invention, an all-solid-state battery comprising the above-described solid electrolyte for all-solid-state batteries is provided.

In this regard, the "all-solid-state battery" is an all-solid-state lithium ion secondary battery. FIG. 2 is a schematic cross sectional view of an all-solid-state battery according to one embodiment of the present invention. An all-solid-state battery 10 has a structure in which a solid electrolyte layer 2 is arranged between a positive electrode layer 1 and a negative electrode layer 3. The all-solid-state battery 10 can be used in various devices including mobile phones, personal computers and automobiles.

The LGPS-based solid electrolyte of the present invention may be contained as a solid electrolyte in at least one of the positive electrode layer 1, the negative electrode layer 3 and the solid electrolyte layer 2. In the case where the LGPS-based solid electrolyte of the present invention is contained in the positive electrode layer 1 or negative electrode layer 3, the LGPS-based solid electrolyte of the present invention is used in combination with a publicly-known positive electrode active material or negative electrode active material for lithium ion secondary batteries. The quantitative ratio of the LGPS-based solid electrolyte of the present invention to be contained in the positive electrode layer 1 or negative electrode layer 3 is not particularly limited.

In the case where the LGPS-based solid electrolyte of the present invention is contained in the solid electrolyte layer 2, the solid electrolyte layer 2 may be composed of the LGPS-based solid electrolyte of the present invention alone, and according to need, an oxide solid electrolyte (e.g., $Li_7La_3Zr_2O_{12}$), a sulfide-based solid electrolyte (e.g., $Li_2S$—$P_2S_5$), other complex hydride solid electrolytes (e.g., $LiBH_4$ and 3 $LiBH_4$—$LiI$), etc. may be suitably used in combination.

The all-solid-state battery is prepared by forming and laminating the above-described layers, and the forming method and laminating method for the respective layers are not particularly limited.

Examples thereof include: a method in which a solid electrolyte and/or an electrode active material are dispersed in a solvent to provide a slurry-like mixture, which is applied by a doctor blade, spin coating or the like and subjected to rolling to form a film; a gas phase method in which film forming and lamination are performed by using a vacuum deposition method, ion plating method, sputtering method, laser ablation method or the like; and a pressing method in which powder is formed by hot pressing or cold pressing (not heating) and laminated.

Since the LGPS-based solid electrolyte of the present invention is relatively soft, it is particularly preferred to prepare the all-solid-state battery by forming the respective layers by means of the pressing method and laminating the layers. As the pressing method, there are hot pressing in which heating is performed and cold pressing in which heating is not performed, but forming the layers can be sufficiently carried out even by means of cold pressing.

Note that the present invention includes a formed body obtained by heating and forming the LGPS-based solid electrolyte of the present invention. The formed body is suitably used as the all-solid-state battery. Further, the present invention includes a method for producing an all-solid-state battery, which includes a step of heating and forming the LGPS-based solid electrolyte of the present invention.

EXAMPLES

Hereinafter, the embodiments of the present invention will be more specifically described by way of examples, but the embodiments are not limited to the examples.

Example 1

<Method for Producing $\beta$-$Li_3PS_4$>

In a glovebox under argon atmosphere, $Li_2S$ (manufactured by Sigma-Aldrich, purity: 99.8%) and $P_2S_5$ (manufactured by Sigma-Aldrich, purity: 99%) were weighed so that the molar ratio of $Li_2S:P_2S_5$ became 1.5:1. Next, to tetrahydrofuran (manufactured by Wako Pure Chemical Industries, Ltd., super dehydrated grade), $Li_2S$ and $P_2S_5$ were added in this order so that the concentration of ($Li_2S+P_2S_5$) became 10 wt %, and mixing was carried out at room temperature for 12 hours. The mixture was gradually dissolved, and an almost homogeneous solution containing a slight amount of an insoluble matter was obtained.

To the obtained mixture, $Li_2S$ was further added so that the composition of all the raw materials including the above-described ones became such that the molar ratio of $Li_2S:P_2S_5=3:1$, and mixing was carried out at room temperature for 12 hours to obtain a precipitate. This was filtered to obtain a filter cake, and it was vacuum dried at 150° C. for 4 hours, thereby obtaining $\beta$-$Li_3PS_4$. The series of operations was carried out in the glovebox under argon atmosphere.

The obtained $\beta$-$Li_3PS_4$ was subjected to Raman spectroscopy described later, and a peak at 420 $cm^{-1}$ corresponding to $PS_4^{3-}$ was confirmed. Note that the whole sulfide raw material used was crystalline.

<Method for Producing $Li_4GeS_4$>

In a glovebox under argon atmosphere, $Li_2S$ (manufactured by Sigma-Aldrich, purity: 99.8%) and $GeS_2$ (manufactured by Sigma-Aldrich, purity: 95% or more) were weighed so that the molar ratio of $Li_2S:GeS_2$ became 2:1, and the materials were mixed using an agate mortar. Note that the whole sulfide raw material used was crystalline.

Next, the obtained mixture was burned under argon atmosphere at 700° C. for 3 hours, thereby obtaining $Li_4GeS_4$ crystal.

<Synthesis of LGPS>

In a glovebox under argon atmosphere, the above-described $\beta$-$Li_3PS_4$ and $Li_4GeS_4$ were weighed so that the molar ratio of ($\beta$-$Li_3PS_4$:$Li_4GeS_4$ became 2:1, and the materials were mixed using an agate mortar. The mixture was formed into a pellet, and the obtained pellet was put into a quartz tube, which was vacuum-sealed. Burning was carried out under vacuum atmosphere at 550° C. for 8 hours, thereby obtaining $Li_{10}GeP_2S_{12}$ crystal.

Example 2

In synthesis of LGPS, $Li_4GeS_4$ was not used, and materials were weighed so that the molar ratio of $\beta$-$Li_3PS_4$:$Li_2S$:$GeS_2$ became 2:2:1, and the materials were mixed using an agate mortar. The mixture was put into a glass reaction tube, which was placed in an electric tube furnace. The portion of the reaction tube where the sample was positioned was heated in the center of the electric tube furnace, and the other end of the reaction tube to which an argon injection line was connected was projected from the electric tube furnace and in a condition at near room temperature. Burning was carried out under argon atmosphere at 550° C. for 8 hours, thereby obtaining $Li_{10}GeP_2S_{12}$ crystal. The amount of a volatile matter that adhered to the portion of the reaction tube projected from the electric tube furnace was very small.

Example 3

<Method for Producing β-$Li_3PS_4$>

In a glovebox under argon atmosphere, $Li_2S$ (manufactured by Sigma-Aldrich, purity: 99.8%) and $P_2S_5$ (manufactured by Sigma-Aldrich, purity: 99%) were weighed so that the molar ratio of $Li_2S:P_2S_5$ became 1:5:1. Next, to tetrahydrofuran (manufactured by Wake Pure Chemical Industries, Ltd., super dehydrated grade), $Li_2S$ and $P_2S_5$ were added in this order so that the concentration of ($Li_2S+P_2S_5$) became 10 wt %, and mixing was carried out at room temperature for 12 hours. The mixture was gradually dissolved, and an almost homogeneous solution containing a slight amount of an insoluble matter was obtained.

To the obtained mixture, $Li_2S$ was further added so that the composition of all the raw materials including the above-described ones became such that the molar ratio of $Li_2S:P_2S_5=3:1$, and mixing was carried out at room temperature for 12 hours to obtain a precipitate. This was filtered to obtain a filter cake, and it was washed, wherein 300 parts by weight of THF was used relative to 100 parts by weight of the filter cake. After that, the filter cake was thinly spread in an alumina boat. This alumina boat was put into a stainless tube, and the temperature was increased to 250° C. over 1 hour while flowing argon (G3 grade) at a linear velocity of 8.8 cm/min. After that, the temperature was kept at 250° C. for 3 hours to perform drying, thereby obtaining β-$Li_3PS_4$. The series of operations was carried out in the glovebox under argon atmosphere. Note that the whole sulfide raw material used was crystalline.

The obtained β-$Li_3PS_4$ was subjected to Raman spectroscopy described later, and a peak at 420 $cm^{-1}$ corresponding to $PS_4^{3-}$ was confirmed.

<Synthesis of LGPS>

$Li_{10}GeP_2S_{12}$ crystal was synthesized in a manner similar to that in Example 2, except that β-$Li_3PS_4$ obtained above was used. The amount of a volatile matter that adhered to the portion of the reaction tube projected from the electric tube furnace was very small.

Example 4

$Li_{10}SnP_2S_{12}$ crystal was synthesized in a manner similar to that in Example 2, except that $SnS_2$ was used instead of $GeS_2$. The whole sulfide raw material used was crystalline. The amount of a volatile matter that adhered to the portion of the reaction tube projected from the electric tube furnace was very small.

Example 5

<Microminiaturization of $SiS_2$>

In a glovebox under argon atmosphere, $SiS_2$ (manufactured by Mitsuwa Chemicals Co., Ltd.) was weighed and put into a 45-mL zirconia pot, zirconia balls ("YTZ" manufactured by Nikkato Corporation, φ: 10 mm, number: 18) were further put therein, and the pot was completely sealed. The pot was attached to a planetary ball mill ("P-7" manufactured by Fritsch) and mechanical milling was carried out at a rotation speed of 370 rpm for 2 hours to obtain microminiaturized $SiS_2$. The particle diameter thereof was measured by means of SEM and it was in the range of from 100 nm to 5 μm.

<Synthesis of $Li_{9.54}Si_{1.74}P_{1.44}S_{11.7}Cl_{0.3}$>

In a glovebox under argon atmosphere, β-$Li_3PS_4$ obtained in Example 1, $Li_2S$ (manufactured by Sigma-Aldrich, purity: 99.8%), the microminiaturized $SiS_2$ obtained above and LiCl (manufactured by Sigma-Aldrich, purity: 99.99%) were weighed so that the molar ratio of β-$Li_3PS_4:Li_2S:SiS_2$:LiCl became 4.8:8.2:5.8:1. Next, the materials were added to acetonitrile (manufactured by Wako Pure Chemical Industries, Ltd., super dehydrated grade) so that the concentration of (β-$Li_3PS_4+Li_2S+SiS_2+LiCl$) became 10 wt %, and mixing was carried out at room temperature for 24 hours to obtain a slurry solution.

The obtained slurry solution was dried under vacuum at 200° C. for 2 hours to remove the solvent. At the time of removing the solvent, the solution was stirred so that heat was transmitted uniformly. After that, it was cooled to room temperature to obtain a precursor.

Using the obtained precursor, $Li_{9.54}Si_{1.74}P_{1.44}S_{11.7}Cl_{0.3}$ crystal was synthesized in a manner similar to that in Example 2, except that the burning temperature was set at 475° C. The whole sulfide raw material used was crystalline. The amount of a volatile matter that adhered to the portion of the reaction tube projected from the electric tube furnace was very small.

Comparative Example 1

In synthesis of LGPS, raw materials were weighed so that the molar ratio of $Li_2S:P_2S_5:GeS_2$ became 5:1:1, and the materials were mixed using an agate mortar. This was used as a raw material for burning and $Li_{10}GeP_2S_{12}$ crystal was synthesized in a manner similar to that in Example 2, except that the inside of the reaction tube at the time of burning was under vacuum. There was a large amount of an attached matter at the portion of the reaction tube projected from the electric tube furnace. After the reaction, XRD of the attached matter was measured and the spectrum pattern thereof corresponded to that of sulfur (S8).

Comparative Example 2

In synthesis of LGPS, $Li_{10}GeP_2S_{12}$ crystal was synthesized in a manner similar to that in Comparative Example 1, except that the inside of the reaction tube at the time of burning was under argon atmosphere. There was an attached matter at the portion of the reaction tube projected from the electric tube furnace, but the amount thereof was smaller than that of Comparative Example 1. After the reaction, XRD of the attached matter was measured and the spectrum pattern thereof corresponded to that of sulfur (S8).

Reference Example 1

In synthesis of LGPS, raw materials were weighed so that the molar ratio of $Li_2S:P_2S_5:GeS_2$ became 5:1:1, and the materials were mixed using an agate mortar. Next, the obtained mixture was put into a 45-mL zirconia pot, zirconia balls ("YTZ" manufactured by Nikkato Corporation, φ: 10 mm, number: 18) were further put therein, and the pot was completely sealed. The pot was attached to a planetary ball mill ("P-7" manufactured by Fritsch) and mechanical milling was carried out at a rotation speed of 370 rpm for 40 hours to obtain an amorphous body. $Li_{10}GeP_2S_{12}$ crystal was synthesized in a manner similar to that in Example 1, except that the amorphous body was used as a raw material for burning.

<X-ray Diffraction Measurement>

Powders of the ion conductors obtained in Examples 1-5, Comparative Examples 1-2 and Reference Example 1 were subjected to the X-ray diffraction measurement under Ar atmosphere at room temperature (25° C.) ("X'Pert3 Powder" manufactured by PANalytical, CuKα: λ=1.5405 Å).

The results of the X-ray diffraction measurement of the ion conductors obtained in Examples 1-5, Comparative Examples 1-2 and Reference Example 1 are shown in FIG. 3.

As shown in FIG. 3, in Examples 1-2, the diffraction peaks were observed at at least 2θ=20.18°±0.50°, 20.44°±0.50°, 26.96°±0.50° and 29.58°±0.60°, and the pattern corresponded to that of $Li_{10}GeP_2S_{12}$ of ICSD database.

When the diffraction intensity of the peak at 2θ=29.58°±0.60° is referred to as $I_A$ and the diffraction intensity of the peak at 2θ=27.33°±0.50° is referred to as $I_B$, $I_B/I_A$ was 0.38 in Example 1, and 0.40 in Example 2.

<Lithium Ion Conductivity Measurement>

Each of the ion conductors obtained in Examples 1-5, Comparative Examples 1-2 and Reference Example 1 was subjected to uniaxial molding (240 MPa) to obtain a disk having a thickness of about 1 mm and a diameter of 8 mm. The AC impedance was measured by the four-terminal method utilizing an In (indium) electrode at room temperature (25° C.) and at 10° C. intervals in temperature ranges of from 30° C. to 100° C. and to −20° C. ("SI1260 IMPEDANCE/GAIN-PHASE ANALYZER" manufactured by Solartron), and the lithium ion conductivity was calculated.

Specifically, the sample was put into a thermostatic bath with its temperature being set at 25° C. and it was kept for 30 minutes, and after that, the lithium ion conductivity was measured. Subsequently, the temperature of the thermostatic bath was increased at 10° C. intervals from 30° C. to 100° C., and at each temperature, it was kept for 25 minutes and then the ion conductivity was measured. After the measurement at 100° C. was finished, the temperature of the thermostatic bath was decreased at 10° C. intervals from 90° C. to 30° C., and at each temperature, it was kept for 40 minutes and then the lithium ion conductivity was measured. Next, the lithium ion conductivity of the sample after being kept in the thermostatic bath whose temperature was set at 25° C. for 40 minutes was measured. After that, the temperature of the thermostatic bath was decreased at 10° C. intervals from 20° C. to −20° C., and at each temperature, it was kept for 40 minutes and then the lithium ion conductivity was measured. The measurement frequency range was 0.1 Hz to 1 MHz, and the amplitude was 50 mV. The measurement results of the lithium ion conductivity at the time of decreasing the temperature are shown in FIG. 4.

<Raman Spectroscopy>

(1) Preparation of Sample

A sample to be measured was prepared by using an airtight container having quartz glass (Φ: 60 mm, thickness: 1 mm) at the upper portion as an optical window. In a glovebox under argon atmosphere, the sample was adhered to the quartz glass, then the container was sealed and taken out from the glovebox, and Raman spectroscopy was carried out.

(2) Measurement Conditions

Using Laser Raman Spectrometer NRS-5100 (manufactured by JASCO Corporation), the measurement was carried out at an excitation wavelength of 532.15 nm for an exposure time of 5 seconds.

The results of Raman spectroscopy of the ion conductors obtained in. Examples 1-5, Comparative Examples 1-2 and Reference Example 1 are shown in FIG. 5. With respect to each sample in Examples 1-2 and Comparative Examples 1-2, a peak at 420 cm$^{-1}$ corresponding to $PS_4^{3-}$ was confirmed. The Raman spectra of the $Li_{10}GeP_2S_{12}$ crystals of Examples 1-2 corresponded to that of $Li_{10}GeP_2S_{12}$ obtained by the standard synthesis method of Reference Example 1.

EXPLANATIONS OF LETTERS OR NUMERALS

1 positive electrode layer
2 solid electrolyte layer
3 negative electrode layer
10 all-solid-state battery

The invention claimed is:

1. A method for producing an LGPS-based solid electrolyte, which comprises:
   mixing $Li_3PS_4$ crystals having a peak at 420±10 cm$^{-1}$ in a Raman measurement and $Li_4MS_4$ crystals (M being selected from the group consisting of Ge, Si and Sn) while still having crystals present to synthesize a precursor; and
   heat treating the precursor at 300 to 700° C.

2. The method according to claim 1, which comprises synthesizing the $Li_4MS_4$ crystals from $Li_2S$ crystals and sulfide crystals represented by $MS_2$ (M being selected from the group consisting of Ge, Si and Sn).

3. The method according to claim 1, wherein the LGPS-based solid electrolyte has peaks at at least 2θ=20.18°±0.50°, 20.44°±0.50°, 26.96°±0.50° and 29.58°±0.60° in X-ray diffraction (CuKα: λ=1.5405 Å).

4. The method according to claim 3, wherein when the diffraction intensity of the peak at 2θ=29.58°±0.60° is referred to as $I_A$ and the diffraction intensity of the peak at 2θ=27.33°±0.50° is referred to as $I_B$, $I_B/I_A$ is less than 0.50.

5. The method according to claim 1, wherein the LGPS-based solid electrolyte has an octahedron O composed of a Li element and a S element, a tetrahedron $T_1$ composed of at least one element selected from the group consisting of P, Ge, Si and Sn and a S element, and a tetrahedron $T_2$ composed of a P element and a S element, and mainly includes a crystal structure in which the tetrahedron $T_1$ and the octahedron O share an edge and the tetrahedron $T_2$ and the octahedron O share an apex.

6. The method according to claim 1, wherein the $Li_3PS_4$ crystals are β-$Li_3PS_4$.

7. The method according to claim 1, wherein the heat treating is carried out under inert gas atmosphere.

8. A method for producing an LGPS-based solid electrolyte, which comprises:
   mixing $Li_3PS_4$ crystals having a peak at 420±10 cm$^{-1}$ in a Raman measurement, $Li_2S$ crystals and sulfide crystals represented by $MS_2$ (M being selected from the group consisting of Ge, Si and Sn) while still having crystals present to synthesize a precursor; and
   heat treating the precursor at 300 to 700° C.

9. The method according to claim 8, wherein the LGPS-based solid electrolyte has peaks at at least 2θ=20.18°±0.50°, 20.44°±0.50°, 26.96°±0.50° and 29.58°±0.60° in X-ray diffraction (CuKα: λ=1.5405 Å).

10. The method according to claim 9, wherein when the diffraction intensity of the peak at 2θ=29.58°±0.60° is referred to as $I_A$ and the diffraction intensity of the peak at $2\theta=27.33°\pm0.50°$ is referred to as $I_B$, $I_B/I_A$ is less than 0.50.

11. The method according to claim 8, wherein the LGPS-based solid electrolyte has an octahedron O composed of a Li element and a S element, a tetrahedron $T_1$ composed of at least one element selected from the group consisting of P Ge, Si and Sn and a S element, and a tetrahedron $T_2$ composed of a P element and a S element, and mainly includes a crystal structure in which the tetrahedron $T_1$ and the octahedron O share an edge and the tetrahedron $T_2$ and the octahedron O share an apex.

12. The method according to claim 8, wherein the $Li_3PS_4$ crystals are $\beta$-$Li_3PS_4$.

13. The method according to claim 8, wherein the heat treating is carried out under inert gas atmosphere.

\* \* \* \* \*